F. NUSSBAUMER.
BOOT PROTECTOR.
APPLICATION FILED SEPT. 17, 1912.
1,074,378. Patented Sept. 30, 1913.
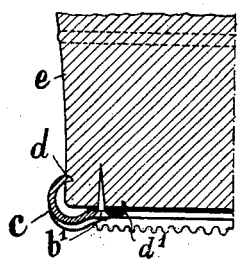
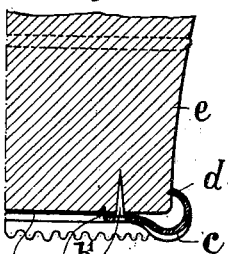
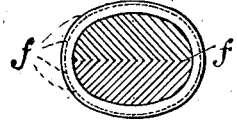
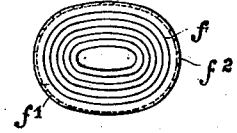
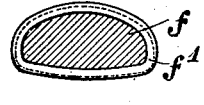
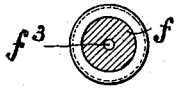
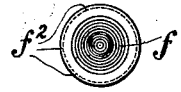
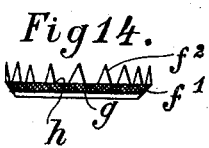
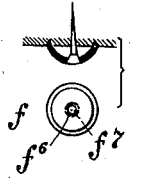
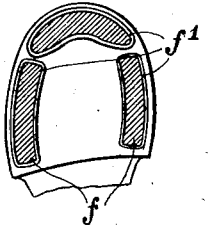
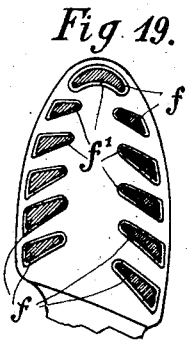
WITNESSES:
John C. Sanders
Albert F. Heuman
INVENTOR
Friedrich Nussbaumer
BY
ATTY.

UNITED STATES PATENT OFFICE.

FRIEDRICH NUSSBAUMER, OF ZUG, SWITZERLAND.

BOOT-PROTECTOR.

1,074,378.  Specification of Letters Patent.  Patented Sept. 30, 1913.

Application filed September 17, 1912. Serial No. 720,801.

*To all whom it may concern:*

Be it known that I, FRIEDRICH NUSSBAUMER, a citizen of the Republic of Switzerland, residing at Zug, in the Canton of Zug, Republic of Switzerland, have invented certain new and useful Improvements in Boot-Protectors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to boot protectors designed to reduce wear, especially uneven wear, of the soles and heels of boots, shoes and the like. Such protecting devices do not fulfil any other purpose than protecting the soles and heels, such as patching damaged portions of the soles or producing a springy tread.

The subject of the present invention is a protector for footgear which does not in any way impair the flexibility of the sole, while it also serves to patch or render water tight defective portions of the sole and in use imparts a springy tread.

With these objects in view the new protector consists of a flexible, springy plate of sheet metal constructed in such a manner as to leave between the footgear and the plate a free space which enables the latter to give a springy effect. The protector is suitable for use on heels and soles, and in the latter use is adapted to accommodate a patch in the said free space in order to increase its patching effect. It also prevents slipping on snow and ice.

Several methods of carrying out the subject of the invention are illustrated in the accompanying drawings, wherein, Figures 1, 2 and 3 represent two examples of a heel-protector plate and Figs. 4 to 14 show sole protector plates.

The forms of the invention shown in Figs. 1, 2 and 3 consist of a heel-shaped strip $a$ of springy sheet metal, for example hardened steel, which strip is fastened to the heel by means of nails $b^1$ inserted through holes $b$. The outer side of the plate is beaded as at $c$, the inner edge $d$ of which penetrates into the side of the heel $e$. This beading is low in Fig. 1 but higher in Fig. 2, and since it gives when trod on, it makes the gait of the wearer soft and elastic. To prevent slipping the beading is ribbed. The forms of the invention shown in Figs. 4 to 14 are made of springy sheet metal, preferably of hardened sheet steel.

As shown in the drawings the form of the plate may vary, but in all forms, however the sheet metal plate is provided with a turned up rim $f^1$ carrying teeth $f^2$ which are forced into the sole. At the same time the inner edge of the rim $f^1$ also penetrates into the leather and makes a tight joint so that no water can penetrate to such portion of the sole as is inclosed by the plate. The free space $g$ in the plate $f$ is adapted to receive a disk $h$ of soft, elastic material, for instance, india-rubber, leather, guttapercha or the like, which increases the patching effect. In walking on these plates they yield, owing to the presence of the free hollow space $g$ between the plate and the sole. If the said hollow space be filled with a patch $h$ the latter spreads out when trod upon and presses against the joint between the plate and the sole, as also against the surface of the sole, so that a secure patch is produced, even where holes are in the sole. The tread surface of the protector plate $f$ is ribbed to prevent slipping.

The protector plates shown in Figs. 10 to 12 are provided with central holes $f^3$ for the insertion of a nail $f^4$ which is intended to be driven into the sole. This nail strengthens the attachment of the plate $f$ to the sole. The patch of yielding material placed in the protector renders the joint more watertight.

The sheet metal plate shown in Fig. 14 is provided with a rounded bend, the inner edge of which can be driven into the sole or heel, to make a tight joint over the protected place.

According to the part of the shoe that is intended to be protected, one or other form of protector plate is used; and indeed, the plates shown in Figs. 4 to 14 can also be affixed to places on the heel if it be only desired to protect individual portions of the same.

The patch $h$ may be omitted when no special patching of a given portion of the sole is desired. The outer and the inner rims of the heel-plate shown in Figs. 1 to 3 may be provided with teeth which latter can be driven into the tread surface and the side of the heel $e$.

In Fig. 15 is shown a ribbed protector plate *f* which has the form of a hemisphere and which replaces the usual shoe-nails. The rim of the plate *f* carries teeth $f^2$. The protector plate *f* shown in Fig. 16 has the form of a rectangle and is provided with ribs $f^5$ and marginal teeth $f^2$. The protector plate *f* shown in Fig. 17 has also the form of a hemisphere and is provided with a central hole $f^6$ for the insertion of a nail $f^7$ intended to be driven into the footgear. In the Fig. 18 is shown a heel with three protector plates and in Fig. 19 is shown a sole provided with plates.

The form of the plates and their ribs may vary and the plates are preferably stamped out hollow.

What I claim is:

A yielding protector for boots and shoes comprising a metal plate having a turned up rim adapted to be driven into the heel or the sole and to render watertight a defective portion of the heel or sole and a patch of yielding material inserted in the hollow of the said plate to render the joint more watertight.

In testimony whereof, I have signed my name to this specification in the presence of two subscribing witnesses.

FRIEDRICH NUSSBAUMER.

Witnesses:
HERMANN HUBER,
ALBERT HEINHERR.